United States Patent [19]

Baeuerle

[11] Patent Number: 5,787,710
[45] Date of Patent: Aug. 4, 1998

[54] HYDRAULIC EMERGENCY CONTROL FOR FRICTION COUPLING ARRANGED BETWEEN THE INTERNAL COMBUSTION ENGINE AND TRANSMISSION

[75] Inventor: Peter Baeuerle, Ludwigsburg, Germany

[73] Assignee: Robert Bosch GmbH, Stuttgart, Germany

[21] Appl. No.: 569,212

[22] PCT Filed: May 20, 1995

[86] PCT No.: PCT/DE95/00666

§ 371 Date: Dec. 18, 1995

§ 102(e) Date: Dec. 18, 1995

[87] PCT Pub. No.: WO96/02768

PCT Pub. Date: Feb. 1, 1996

[30] Foreign Application Priority Data

Jul. 14, 1994 [DE] Germany .............. 44 24 790.7

[51] Int. Cl.[6] ............................................. F16D 31/02
[52] U.S. Cl. ........................ 60/468; 60/494; 192/12 C
[58] Field of Search .................... 60/403, 406, 494, 60/413, 468; 192/12 C

[56] References Cited

U.S. PATENT DOCUMENTS

| | | | |
|---|---|---|---|
| 4,531,624 | 7/1985 | Ideta | 60/403 X |
| 4,748,809 | 6/1988 | Sumiya et al. | 60/413 X |
| 5,040,653 | 8/1991 | Vukovich et al. | 60/413 X |
| 5,105,929 | 4/1992 | Schmid et al. | 192/12 C |

FOREIGN PATENT DOCUMENTS

| | | |
|---|---|---|
| 0324928 | 11/1988 | European Pat. Off. . |
| 0498210 | 8/1992 | European Pat. Off. . |
| 3613800 | 10/1987 | Germany . |
| 4120597A1 | 1/1992 | Germany . |
| 62-215130 | 9/1987 | Japan . |

*Primary Examiner*—Hoang Nguyen
*Attorney, Agent, or Firm*—Michael J. Striker

[57] ABSTRACT

A hydraulic emergency circuit for a hydraulically-operated friction clutch disposed as a part as an electro-hydraulic clutch control between an internal combustion engine and a transmission has a hydraulic pump provided for supplying at least one working line and connected with a power take-off shaft of the internal combustion engine, a throttle valve disposed in the working line, two control lines branching off upstream and downstream of the throttle valve, and a switch valve connected with the control lines and provided for controlling and operating a supply of pressure for the friction clutch, the control line upstream of the throttle valve being connected to a first control input of the switch valve, the control line disposed downstream of the throttle valve being in hydraulic connection with a second control input of the switch valve which is located approximately opposite to the first control input, and a restoring string disposed on a control piston side adjoining the second control input.

9 Claims, 2 Drawing Sheets

5,787,710

HYDRAULIC EMERGENCY CONTROL FOR FRICTION COUPLING ARRANGED BETWEEN THE INTERNAL COMBUSTION ENGINE AND TRANSMISSION

BACKGROUND OF THE INVENTION

The invention relates to an hydraulic emergency circuit.

An hydraulic emergency circuit for an electronically-controlled continuously variable transmission (continuously variable transmission CVT) is known from EP 0 324 928, which is preferably employed in passenger cars. A portion of the emergency hydraulic circuit relates to the control of a clutch device connecting a vehicle engine with a continuously operating transmission without the interposition of a hydrodynamic torque converter. For this purpose the circuit contains a pressure limiting valve which opens a non-return valve, with which it is mechanically coupled, when the pump pressure falls below a preselected value. The non-return valve places a downstream located clutch valve into its reverse position so that the clutch is opened. When the preselected pump pressure is exceeded, the non-return valve takes up a flow-through position. As a result the clutch valve is placed into the forward position. The clutch is closed.

SUMMARY OF THE INVENTION

Accordingly, it is an object of the present invention to provide a hydraulic emergency control which avoids the disadvantages of the prior art.

In accordance with the present invention, a throttle valve is disposed in the working line, and at least one control line branches off upstream and downstream of the throttle valve, wherein the control lines are connected with a switch valves which controls and operates the supply of pressure for the friction clutch.

The hydraulic emergency circuit in accordance with the invention is used to control a friction clutch, which can be a wet clutch, without the assistance of an electro-hydraulic clutch management which is active during normal driving operations. Since during the starting operation and up to a defined lower engine rpm. at which sufficient torque can be made available for the vehicle operation, the friction coupling must compensate for the difference between internal combustion rpm and the drive train rpm by slipping, great demands are made on the hydraulic emergency circuit. A suitable circuit, such as the hydraulic emergency circuit in accordance with the invention represents, prevents the unintended shut-down or stalling of the internal combustion engine and keeps the clutch wear small by gentle engagement in spite of the use of simple circuit components. Rapid and assured declutching also acts in a wear-reducing way.

The engine rpm which are relevant for opening and closing of the friction clutch are measured as a function of the pressure drop at a throttle point in a working line of the hydraulic emergency circuit. The throttle valve required for this can be integrated without problems into known hydraulic circuits.

The emergency valve furthermore prevents a control interference between the electro-hydraulic clutch management and the hydraulic emergency circuit during normal driving operations.

Furthermore, with the aid of a throttle check valve disposed upstream of the friction clutch, in combination with a hydraulic pressure reservoir, it is accomplished that the hydraulic oil pressure in the clutch rises slowly and in a defined manner during a closing operation of the friction clutch, by means of which a jerk-free start with little stress on the clutch is made possible.

A check valve element in the throttle check valve causes the sufficiently rapid opening of the friction clutch.

BRIEF DESCRIPTION OF THE DRAWINGS

Two exemplary embodiments of the invention are schematically represented in the drawings in the form of hydraulic circuit diagrams and are explained in more detail in the following description of the drawing figures. Shown are in.

DESCRIPTION OF THE PREFERRED EMBODIMENTS

Normally an optimal clutch pressure is set with the aid of an electro-hydraulic control device in accordance with the rpm and the torque of the internal combustion engine. In case of a failure of the electronic control used for this, the hydraulic circuit in accordance with the invention assures the safe starting and braking of the vehicle in an emergency driving operation.

Figure 1:
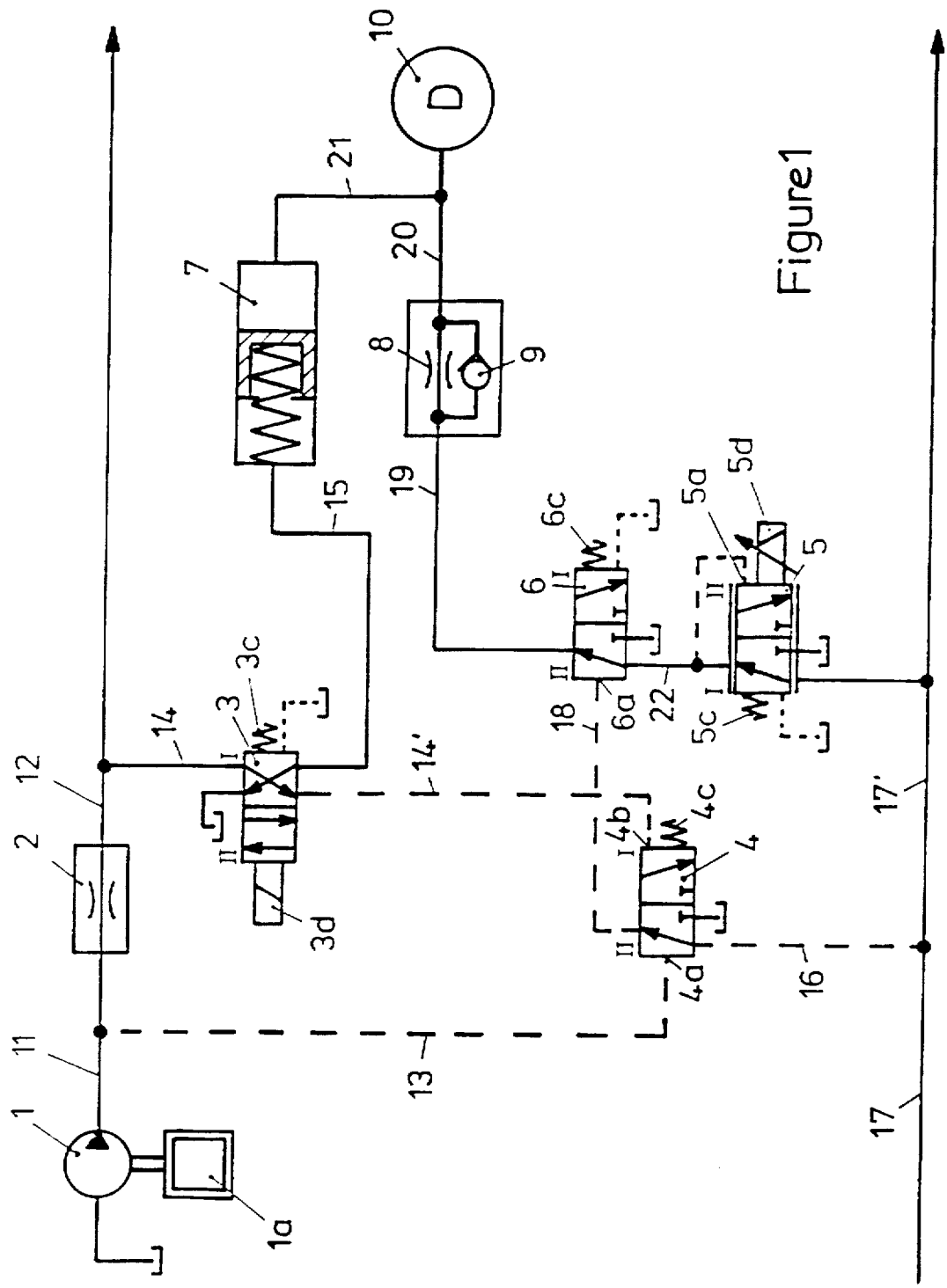
FIG. 1, a clutch control with one emergency valve and two reversing valves.

FIG. 1 shows a portion of a hydraulic circuit diagram for controlling a wet clutch (10). In case of emergency driving operations all electrically controlled valves, in this case an emergency valve (3) and a clutch pressure valve (5), are without current.

A hydrostatic pump (1), driven by a vehicle engine (1a) with a power take-off shaft, supplies the working line (11) with hydraulic oil, which is partially dammed back at a throttle valve (2). Respective lines (13) and (14) branch off upstream and downstream of the throttle valve (2). The line (14) leads via the emergency valve (3), a 4/2-way valve, with an electrical actuation (3d) on the left and a restoring spring (3c) on the right, and the control line (14') to a control connector (4b) of a reversing valve (4), a 3/2 way valve. The control line (13) directly leads to this reversing valve, namely to its control connector (4a).

Since, at least in the lower rpm range, the engine rpm and the amount delivered by the pump are proportionally related to each other, it is possible to associate defined engine rpm with the respective pressure conditions on both sides of the throttle valve (2) during a starting or braking operation. During a starting operation under emergency driving operations, the clutch engagement process is started as soon as the pressure drop $\Delta_p = P_{11} - P_{12}$ ($p_{11}$: pressure in the working line (11); $P_{12}$: pressure in the working line (12)) at the throttle valve (2) and therefore also the engine rpm have fallen below a lower threshold value. The pressure $P_{11}$ is applied at the control connector (4a) of the reversing valve (4), while the hydraulic oil under the pressure $P_{12}$ is guided to the oppositely located control connector (4b). The reversing valve (4) moves against the force of its restoring spring (4c) into the switch position II and in this way connects the control lines (16) and (18) connected with it. The control line (16) is supplied with hydraulic oil from the auxiliary pressure work line (17), which is hydraulically connected with the pump (1) via valves, not shown. The control connector (6a) of a further reversing valve (6) is provided with pressure via the reversing valve (4) and the control line (18).

The reversing valve (6), a 3/2-way valve, which is hydraulically controlled at the left via the control connector (6a) and has a restoring spring (6c) on the right, is displaced toward the right against the force of its restoring spring (6c) from the switch position I into the flow-through position II for the connected working lines (22) and (19). The working line (22) is connected with the auxiliary pressure working line (17') via a clutch pressure valve (5). The clutch pressure valve (5), a 3/2-way sensor valve with a restoring spring (5c) on the left, a controllable electrical actuation (5d) on the right, including an output pressure control (5a), adjusts the maximum clutch pressure because of the lack of current supply. The hydraulic oil flows from the auxiliary working line (19) via the throttle area (8) of a throttle check valve (8, 9) and the auxiliary working line (20) to a wet clutch (10). A further working line (21) branches off the auxiliary working line (20) and feeds an accumulator (7). Because of the retreat of the spring-loaded accumulator piston, the pressure in the wet clutch does not increase suddenly, but slowly. Starting at a defined hydraulic oil pressure the wet clutch is closed. The hydraulic oil located at the back of the accumulator piston is routed via the working line (15), and the emergency valve (3) into the reservoir.

If the vehicle is now braked, the engine rpm drops because of the connection of the engine and the drive train by means of the transmission and clutch. Because of the reduction in the amount delivered by the pump connected therewith, the pressure drop $delta_p = P_{11} - P_{12}$ at the throttle valve (2) is also reduced. If $delta_p$ falls below a lower threshold value, the reversing valve (4) is displaced by the force of the spring (4c) out of the switch position II into the switch position I, provided the emergency valve (3) is also still in its switch position I. The control line (18) is relieved by this. The reversing valve (6) is moved from the switch position II into the switch position I, because of which the hydraulic oil pressure in the wet clutch (10) and in the accumulator (7) drops to zero. The hydraulic oil flows via both parts (8) and (9) of the check throttle valve (8, 9) and the reversing valve (6) into the reservoir. The reversing valve (6) allows the rapid and assured opening of the wet clutch (10) independently of the hydraulic oil pressures in the auxiliary working lines (19) and (20).

The emergency valve (3), which is in the switch position I during the emergency driving operation, is supplied with electrical current when there is no emergency driving operation. Because of this it is in the switch position II during normal driving operation.

In this switch position II the back of the piston of the accumulator (7) is provided with hydraulic oil via the lines (12), (14) and (15). Since as a rule the pressure in these working lines is higher than in the auxiliary working lines (17, 17'), the piston of the accumulator (7), with the work spring almost relaxed, is located on its right stop. Because of this, the dynamics of the clutch control are not hampered by the accumulator (7).

In the switch position II of the emergency valve (3) the control line (14') is connected with the reservoir. The pressure $P_{11}$ at the control connector (4a) of the reversing valves (4) assures that the reversing valve (4) is maintained in the switch position II against the force of the spring (4c). In the process the control connector (4b) is relieved in the direction toward the reservoir via the emergency valve (3), which is in the switch position II. By means of this the opening of the wet clutch (10) is prevented during normal driving operations.

The emergency valve can also be a 3/2-way valve which is actuated or controlled in the same way as the 4/2-way valve version. In this case the line (14) is connected with the control line (14') during emergency driving operation. During normal driving operation the control line (14') is connected with the reservoir. The working line (15) is omitted in this emergency valve version. The space back of the piston in the accumulator (7) is connected directly with the reservoir via an overflow line.

In both valve versions the emergency valve can also be hydraulically activated via an electric valve.

Figure 2:
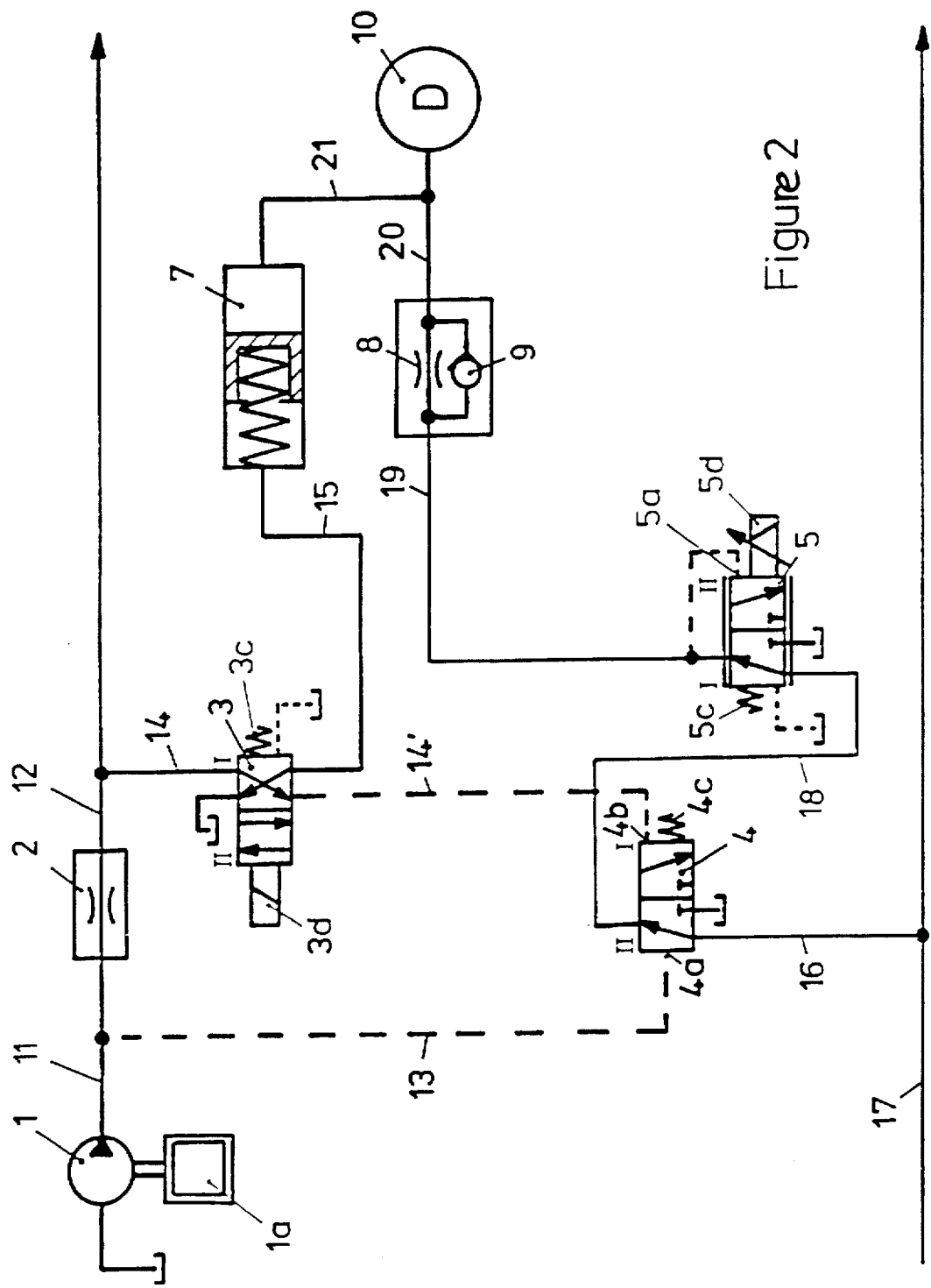
FIG. 2, a clutch control with one emergency valve and one reversing valve.

A clutch control is represented in FIG. 2 in which the rpm-dependent reversing valve (4) does not control a further reversing valve and instead supplies the clutch pressure valve (5) with hydraulic oil directly from the auxiliary working line (17). For this purpose the reversing valve (4) is connected with the working input of the clutch pressure valve (5) via the working line (18). As a result of this the reversing valve (6) can be omitted, which leads to a cost-effective construction of the hydraulic emergency circuit.

I claim:

1. A hydraulic emergency circuit for a hydraulically-operated friction clutch disposed as a part as an electro-hydraulic clutch control between an internal combustion engine and a transmission, comprising a hydraulic pump provided for supplying at least one working line and connected with a power take-off shaft of the internal combustion engine, a throttle valve disposed in the working line, two control lines branching off upstream and downstream of the throttle valve, and a switch valve connected with the control lines and provided for controlling and operating a supply of pressure for the friction clutch, the control line upstream of the throttle valve being connected to a first control input of the switch valve, the control line disposed downstream of the throttle valve being in hydraulic connection with a second control input of the switch valve which is located approximately opposite to the first control input, and a restoring spring disposed on a control piston side adjoining the second control input.

2. A hydraulic emergency circuit as defined in claim 1, and further comprising auxiliary working lines to the friction clutch, and a reversing valve which is controlled by the switch valve and charges and release the auxiliary working lines.

3. A hydraulic emergency circuit as defined in claim 2, and further comprising a throttle check valve disposed in one of the auxiliary working lines upstream of the friction clutch and having a check valve port blocking in a direction toward the friction clutch.

4. A hydraulic emergency circuit as defined in claim 1, and further comprising additional working lines, and an accumulator, one of the additional working lines being disposed upstream of the friction clutch, leading to the accumulator, and branching off the other additional working line.

5. A hydraulic emergency circuit as defined in claim 1, and further comprising a reservoir, the accumulator having a spring-loaded separating piston and being hydraulically connected at a piston bottom side with the clutch and on a spring side with the reservoir.

6. A hydraulic emergency circuit as defined in claim 1, and further comprising an accumulator having a spring-loaded separating piston and being hydraulically connected on a piston bottom side with the clutch and during normal driving operations on a spring side with the working line.

7. A hydraulic emergency circuit as defined in claim 1, wherein the throttle valve is adjustable.

8. A hydraulic emergency circuit as defined in claim 1, and further comprising a restoring spring provided for the switch valve and being adjustable.

9. A hydraulic emergency circuit as defined in claim 1, and further comprising a control connector and a reservoir arranged so that in normal driving operations the switch valve connects the control connector with the reservoir, and in emergency driving operations the switch valve connects the control connector via one of the control lines with one of the working lines.

* * * * *